(12) United States Patent
Wu

(10) Patent No.: US 7,350,791 B2
(45) Date of Patent: Apr. 1, 2008

(54) PROPPING STRUCTURE OF A GOLF TROLLEY

(75) Inventor: Fang-Li Wu, Tainan (TW)

(73) Assignee: Sports World Enterprise Co., Ltd., Tainan Hsien (TW)

( * ) Notice: Subject to any disclaimer, the term of this patent is extended or adjusted under 35 U.S.C. 154(b) by 310 days.

(21) Appl. No.: 11/280,223

(22) Filed: Nov. 17, 2005

(65) Prior Publication Data
US 2007/0108709 A1    May 17, 2007

(51) Int. Cl.
*B62B 3/00* (2006.01)

(52) U.S. Cl. .................. 280/47.26; 280/62
(58) Field of Classification Search ............. 280/47.24, 280/47.26, 47.34, DIG. 6, 62, 79.6; D34/15
See application file for complete search history.

(56) References Cited

U.S. PATENT DOCUMENTS

| | | | | |
|---|---|---|---|---|
| 6,000,712 A | * | 12/1999 | Wu | 280/639 |
| 6,364,327 B1 | * | 4/2002 | Liao | 280/40 |
| 6,883,824 B2 | * | 4/2005 | Yang | 280/646 |
| 6,918,604 B2 | * | 7/2005 | Liao | 280/47.26 |
| D519,704 S | * | 4/2006 | Wu | D34/15 |
| D531,778 S | * | 11/2006 | Liao | D34/15 |
| 7,237,795 B2 | * | 7/2007 | Wu | 280/651 |
| D548,420 S | * | 8/2007 | Liao | D34/15 |

* cited by examiner

*Primary Examiner*—Christopher P. Ellis
*Assistant Examiner*—Brian L Swenson
(74) *Attorney, Agent, or Firm*—Rosenberg, Klein & Lee

(57) ABSTRACT

A golf trolley includes a frame, and two propping members; the frame includes two tube parts; each of the propping members includes a sleeve portion, a connecting portion, a prop pad, and a stopping element; the sleeve portion is positioned around a corresponding one of the tube parts of the frame, and has a slot thereon, which extends in a direction perpendicular to an axial direction of the sleeve portion; the connecting portion is connected to the sleeve portion and the prop pad; the thickness of an upper end of the prop pad is greater than that of a lower end of the prop pad; the stopping element is secured on the corresponding tube part and held within the slot of the sleeve portion such that the propping member pivots about an axis of the tube part within a range depending on the length of the slot.

5 Claims, 8 Drawing Sheets

PROPPING STRUCTURE OF A GOLF TROLLEY

BACKGROUND OF THE INVENTION

1. Field of the Invention

The present invention relates to a propping structure of a golf trolley, more particularly one, which includes two propping members pivotal on respective ones of tube parts of a trolley frame; thus, the propping members will closely touch any-sized golf bag for the golf bag to be firmly held in position when the golf bag is leaned against them.

2. Brief Description of the Prior Art

Golfers usually use golf trolleys to take golf bags in order to save strength on a golf course because golf bags are usually very heavy in weight with many golf clubs held therein.

Referring to FIGS. 1 and 2, a currently existing golf trolley 9 includes a trolley frame 91, wheels 92 connected to the lower end of the trolley frame 92, and a propping mechanism 93 joined to the trolley frame 92 for a golf bag to lean against. The trolley frame 91 includes several tube parts 911, which are light in weight, and in pivotal connected relationship such that the golf trolley 9 can be folded to occupy less space, and can be moved and transported with ease. The propping mechanism 93 includes two connecting portions 931, and two golf bag prop pads 932; the connecting portions 931 are secured to respective ones of the tube parts 911 of the trolley frame 91 at a first end, and the golf bag prop pads 932 are joined to second ends of the connecting portions 931 respectively such that there is a certain angle between each golf bag prop pad 932 and the corresponding connecting portion 931. In addition, a first fastening strap 94 is connected to both the golf bag prop pads 932, and a second fastening strap 94 is connected to lower ends of the tube parts 911 of the frame 91. Therefore, a golf bag (not shown) will be firm on the golf trolley 9 after the golf bag is leaned against the golf bag prop pads 932, and the first and the second fastening straps 94 are used to press the golf bag tightly against the prop pads 932, and to support the golf bag respectively.

However, the golf trolley 9 is only suitable for use with golf bags of a particular size, and other-sized golf bags can't touch the prop pads 932 closely when leaned against the prop pads 932 because the shape and position of the golf bag prop pads 932 is fixed; a golf bag won't be firm on the golf trolley 9 if it doesn't touch the prop pads 932 closely. And, a person will have to buy and use several golf trolleys if he has several golf bags of different sizes. Therefore, the above golf trolley isn't economical to use.

SUMMARY OF THE INVENTION

It is a main object of the invention to provide an improvement on a golf trolley to overcome the above-mentioned problem. The golf trolley of the present invention includes a frame, and two propping members. The frame includes two tube parts. Each of the propping members includes a sleeve portion, a connecting portion, a prop pad, and a stopping element; the sleeve portion is positioned around a corresponding one of the tube parts of the frame, and has a slot thereon, which extends in a direction perpendicular to an axial direction of the sleeve portion; the stopping element is secured on the corresponding tube part and held within the slot of the sleeve portion such that the propping member pivots about an axis of the tube part within a certain range. Golf bags of different sizes can be firmly held on the golf trolley because the propping members can always touch the golf bag closely.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
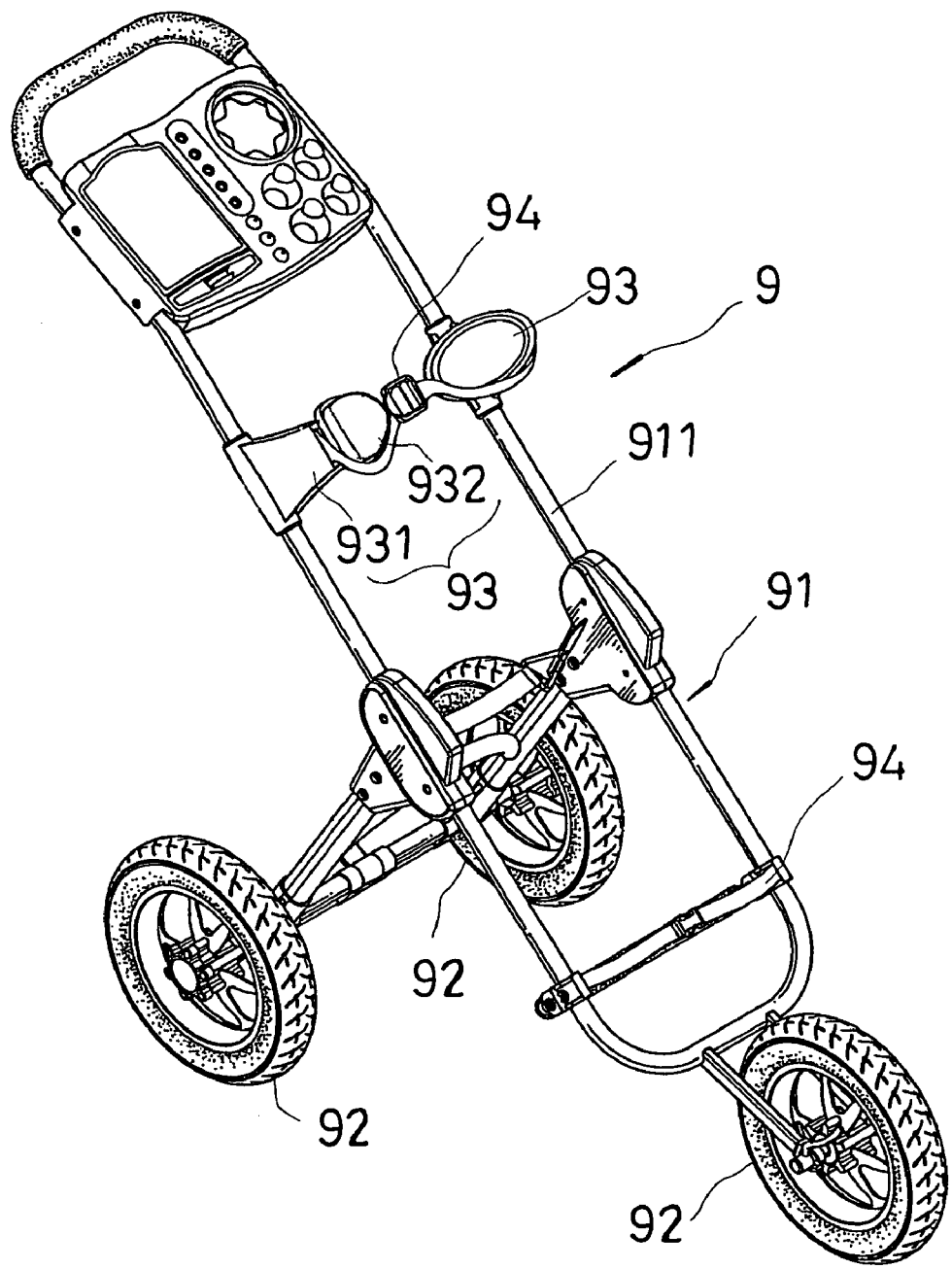
FIG. 1 is a perspective view of the conventional golf trolley.
Figure 2:
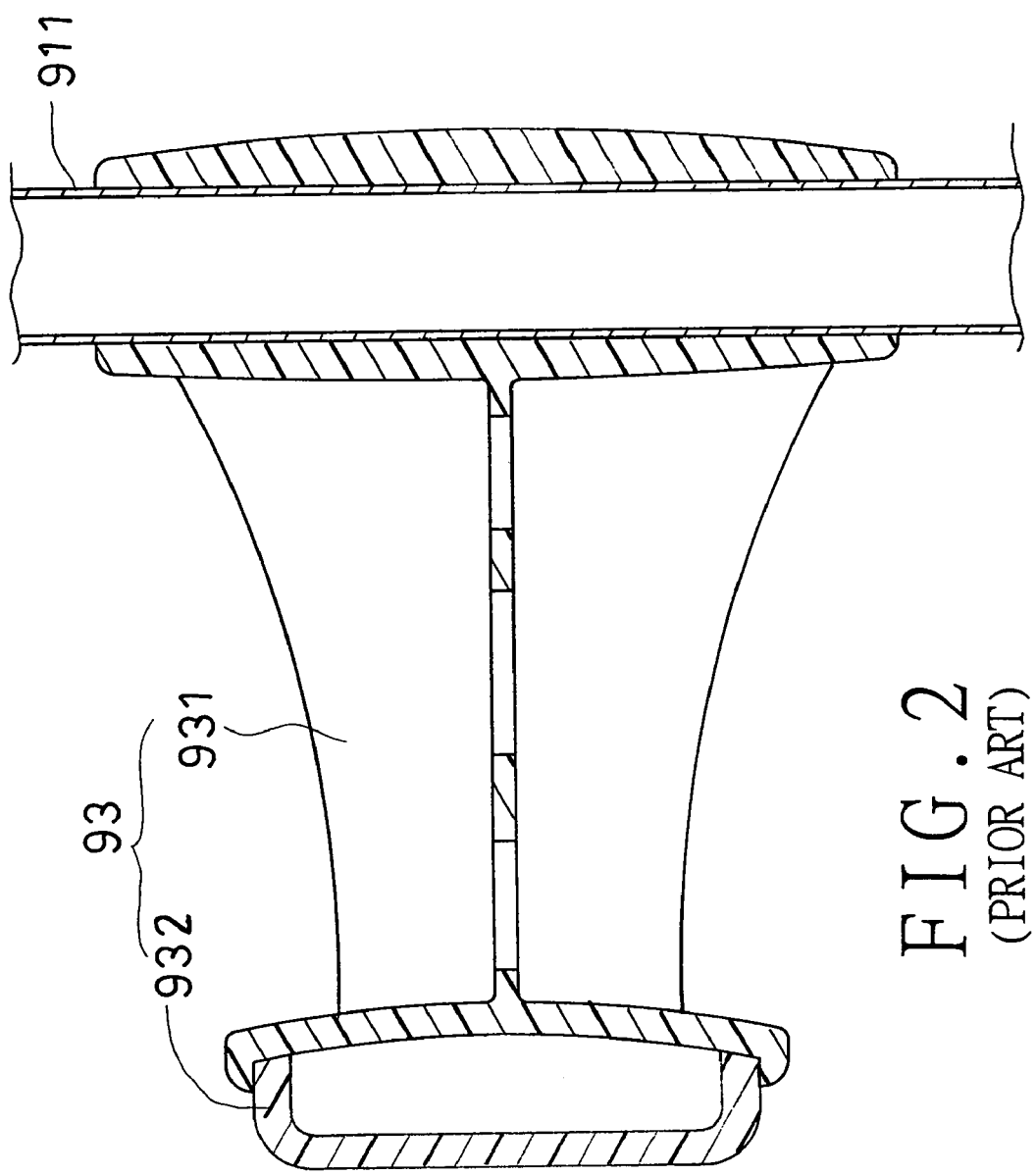
FIG. 2 is a partial sectional view of the conventional golf trolley.
Figure 3:
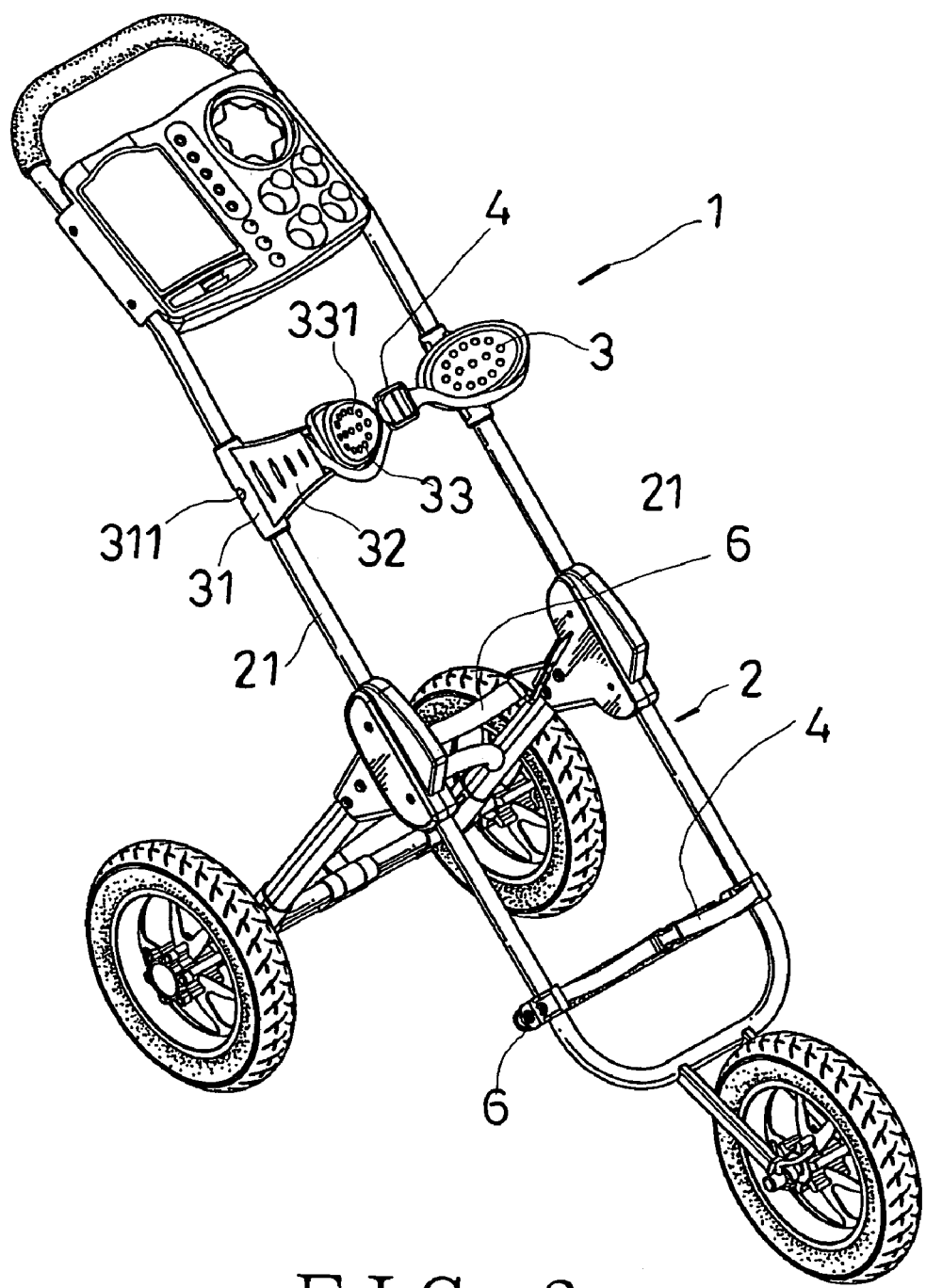
FIG. 3 is a perspective view of the golf trolley in the present invention.
Figure 4:
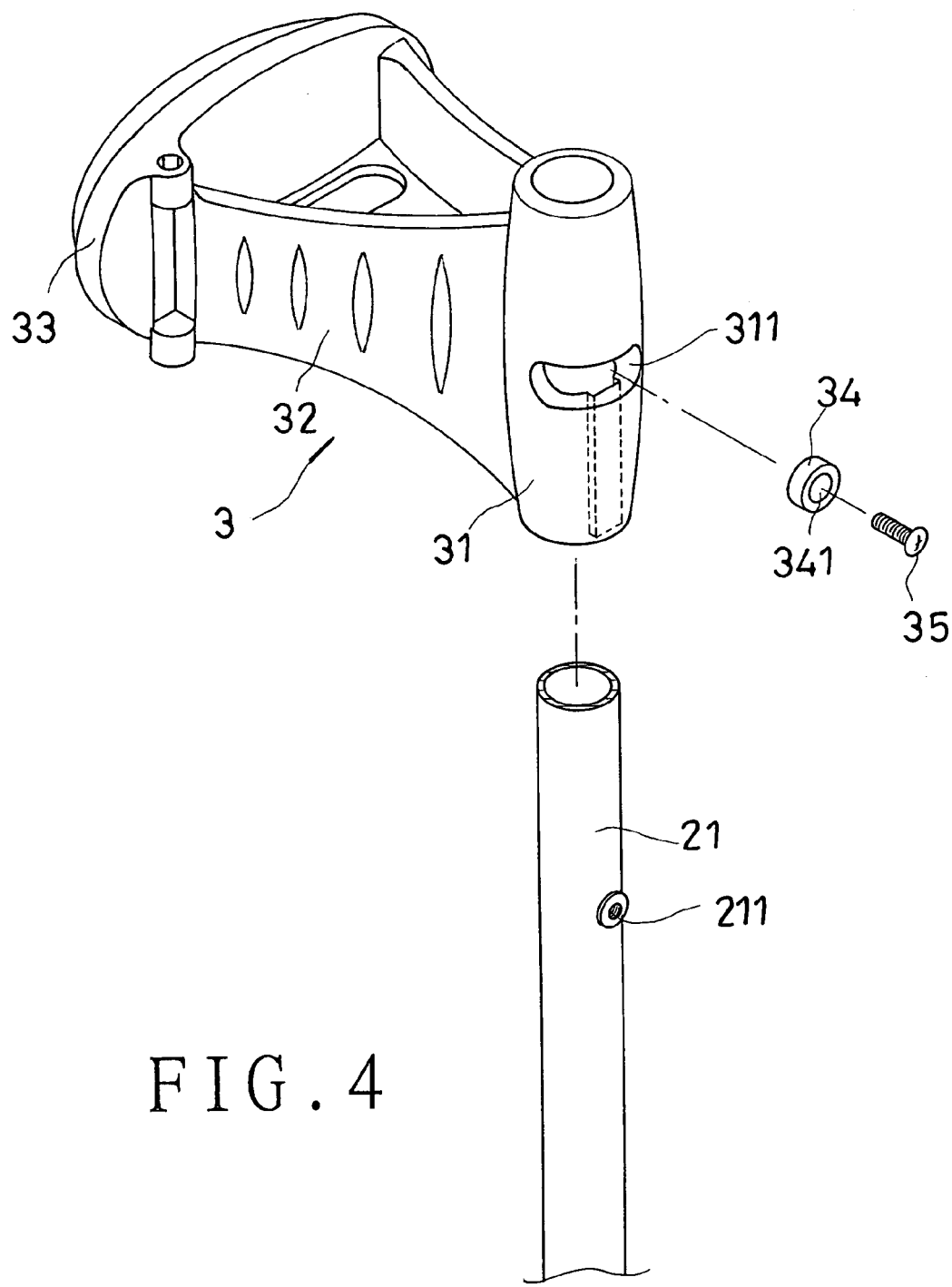
FIG. 4 is a fragmentary exploded perspective view of the golf trolley in the present invention.
Figure 5:
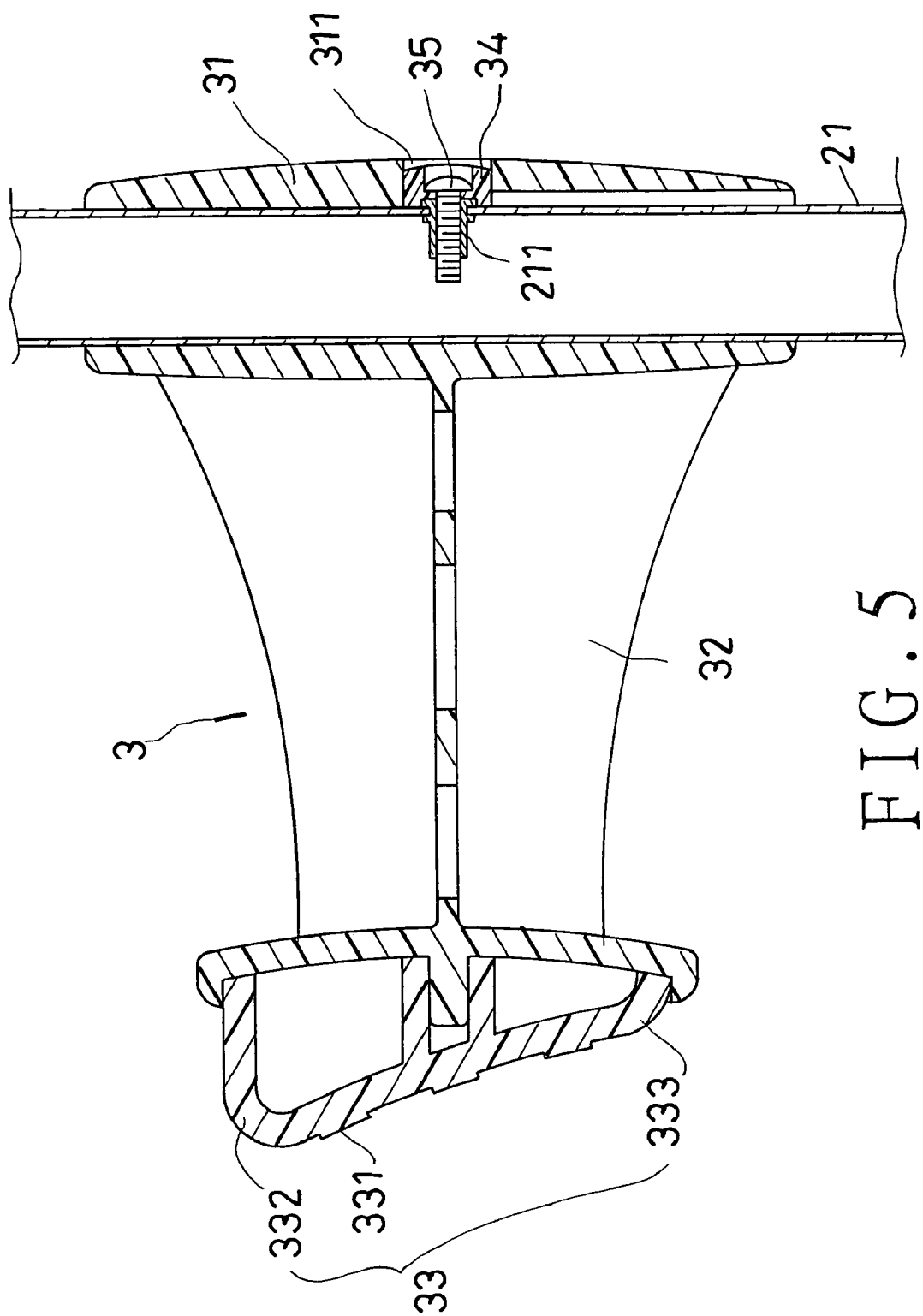
FIG. 5 is a partial sectional view of the present golf trolley.
Figure 6:
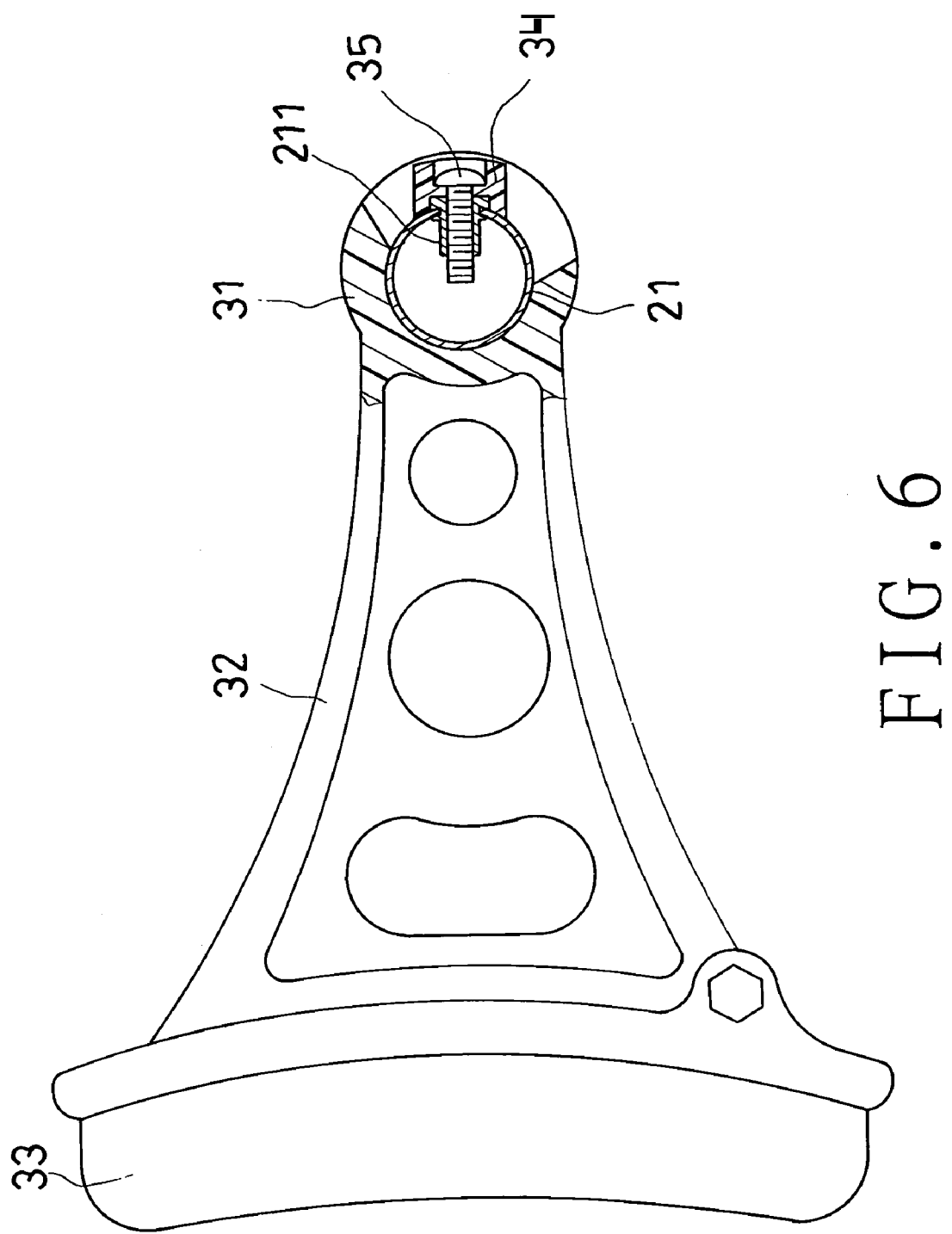
FIG. 6 is a partial top view of the propping member in the present invention.

Referring to FIG. 3 to 8, a preferred embodiment of a propping structure 1 of a golf trolley in the present invention includes a trolley frame 2, and two propping members 3.

The trolley frame 2 includes two tube parts 21, each of which has a nut 211 securely fitted in a through hole thereof. Each of the propping members 3 includes a sleeve portion 31, a connecting portion 32, a golf bag prop pad 33, and a stopping element 34; the sleeve portion 31 has a slot 311 thereon, which extends in a direction perpendicular to the axial direction of the sleeve portion 31; the connecting portion 32 is securely joined to the sleeve portion 31 at one end, and the golf bag prop pad 33 at the other end such that there is a certain angle between the connecting portion 32 and the golf bag prop pad 33; the golf bag prop pad 33 has a slip-prevention element 331 secured on a surface thereof, and it is formed such that the thickness of an upper end 332 thereof is greater than that of a lower end 333 thereof; each of the stopping elements 34 has a through hole 341. In the present preferred embodiment, the slip-prevention elements 331 have several bumps thereon.

In assembly, the propping members 3 are positioned around respective ones of the tube parts 21 of the trolley frame 2 at the sleeve portions 31 thereof. And, the stopping elements 34 are positioned in respective ones of the slots 311 of the sleeve portions 31, and screws 35 are passed through the through holes 341 of the stopping elements 34 and the nuts 211; thus, the propping members 3 can be pivoted leftwards and rightwards relative to the tube parts 21 of the trolley frame 2, and they can't be linearly displaced relative to the tube parts 21. Therefore, the range of pivotal movement of the propping members 3 depends on the length of the slots 311 of the sleeve portions 3, and the stopping elements 34 will prevent the propping members 3 from moving outside the range. In addition, referring to FIG. 7, if there is no external force exerted on the propping members 3, they will stay in an inward position, in which position the golf bag prop pads 33 will face in substantially opposite directions.

Furthermore, a first supporting strap 6 is connected to middle portions of the tube parts 21 of the trolley frame 2 at two ends thereof. A first fastening strap 4 is connected to both the golf bag prop pads 33 at two ends thereof. And, a second fastening strap 4 and a second supporting strap 6 are connected to lower ends of the tube parts 21 at two ends respectively.

Figure 7:
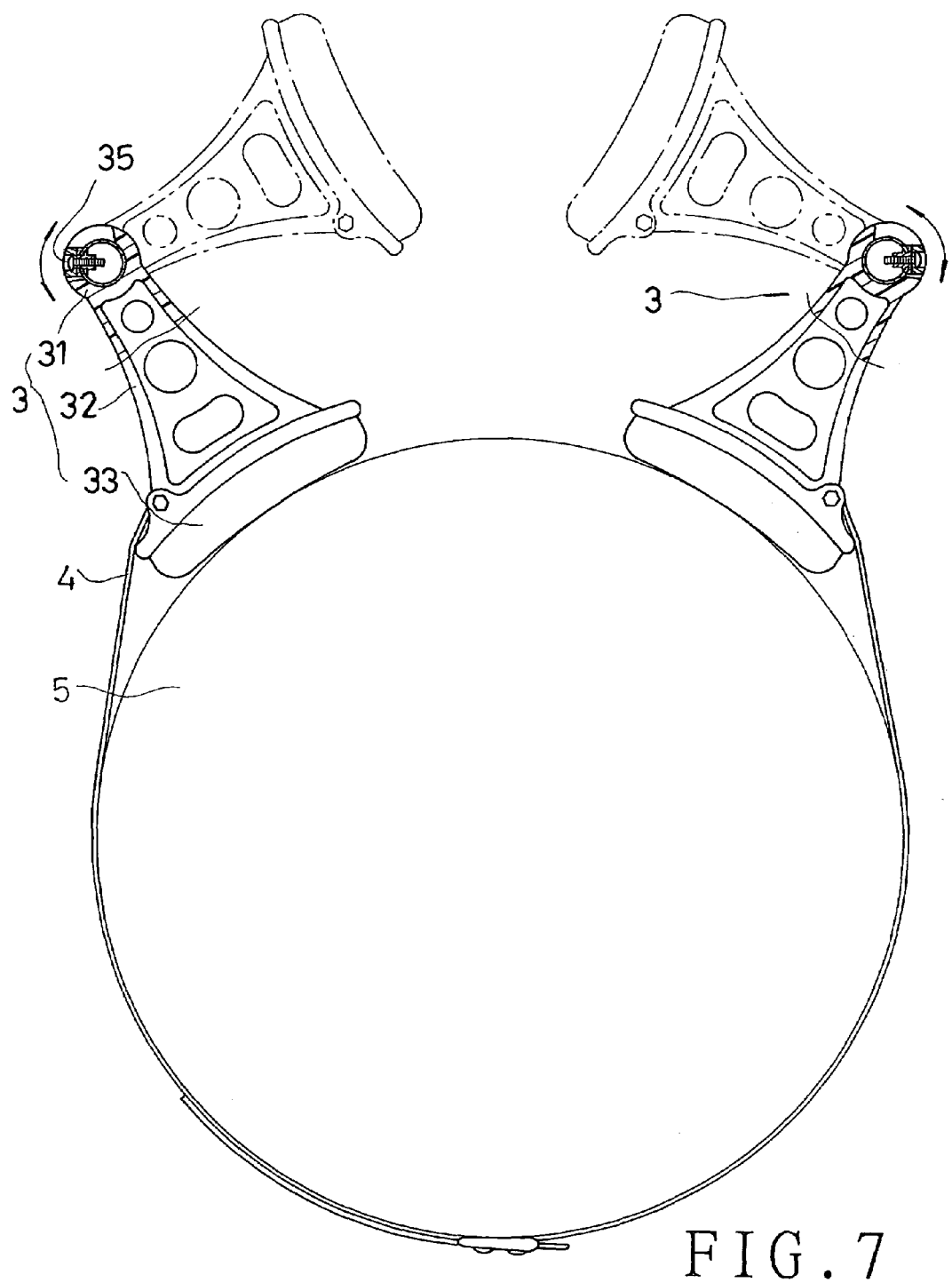
FIG. 7 is a view showing the use of the propping member.
Figure 8:
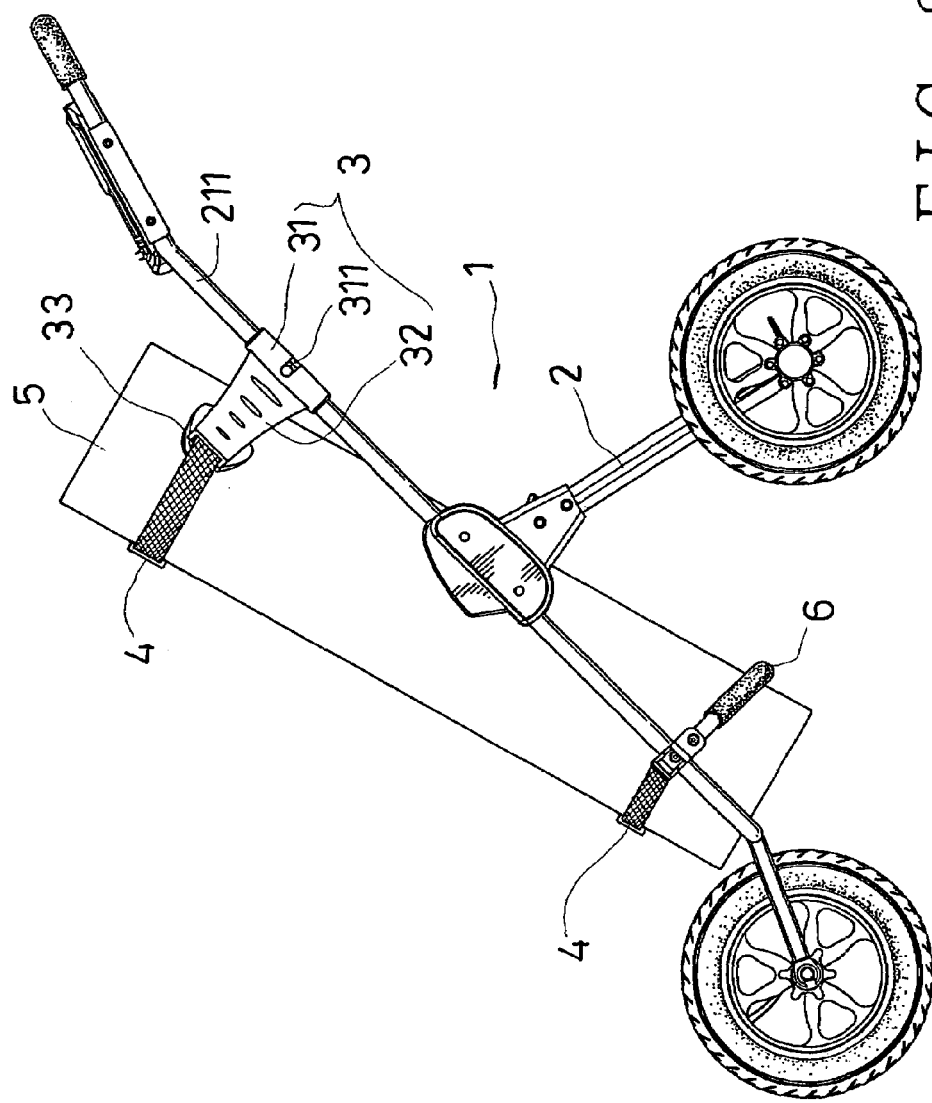
FIG. 8 is a side view of the golf trolley with a golf bag thereon.

Referring to FIGS. 7 and 8, to make a golf bag 5 firmly held on the golf trolley, first the user pivots the golf bag prop pads 33 of the propping members 3 forwards and away from the inward opposed position, and the golf bag 5 is leaned against the golf bag prop pads 33 of the propping members at an upper end thereof, closely touching the surfaces of the slip-prevention elements 331 of the golf bag prop pads 33, and it is further propped on the first supporting strap 6 at a middle portion thereof. And, the first fastening strap 4 is passed over the upper end of the golf bag 5 to make the golf bag 5 tightly pressed against the slip-prevention elements 331, and the second fastening strap 4 and the second supporting strap 6 are tightly bound around a lower end of the golf bag 5. Therefore, the golf bag 5 is firmly held on the golf cart without possibility of falling off.

From the above description, it can be easily seen that the golf trolley propping structure of the present invention has the following advantages:

1. Golf bags of different sizes can be firmly held on the golf trolley, and a person is allowed to use the golf trolley to take any one of his various golf bags because the propping members can pivot on the tube parts of the trolley frame for the golf bag prop pads thereof to touch the golf bag closely. And, the slip-prevention elements on the golf bag prop pads can prevent slipping of the golf bag.

2. The manufacturers of the golf trolley will have lower inventory cost and can manage the inventory more easily because a golf trolley of the present invention is suitable for use with any one of different sized golf bags.

What is claimed is:

1. Propping structure of a golf trolley, comprising
   (a) a trolley frame includes a plurality of tube parts; and
   (b) two propping members pivoted to the trolley frame; each of the propping members including:
   a sleeve portion positioned around a corresponding one of the tube parts of the trolley frame; the sleeve portion having a slot thereon, which extends in a direction perpendicular to an axial direction of the sleeve portion;
   a connecting portion;
   a golf bag prop pad; and
   a stopping element; the stopping element being secured on the corresponding tube part and held within the slot of the sleeve portion such that the propping member pivots about an axis of the tube part.

2. The propping structure of a golf trolley as claimed in claim 1, wherein each of stopping elements has a through hole, and screws are passed through the through holes of the stopping elements as well as nuts secured on the tube parts of the trolley frame to fix the stopping elements on the tube parts.

3. The propping structure of a golf trolley as claimed in claim 1, wherein thickness of an upper end of each of the golf bag prop pads is greater than that of a lower end of the golf bag prop pad.

4. Propping structure of a golf trolley, comprising
   (a) a trolley frame includes a plurality of tube parts; and
   (b) two propping members pivoted to the trolley frame; each of the propping members including
   a sleeve portion positioned around a corresponding one of the tube parts of the trolley frame; the sleeve portion having a slot thereon, which extends in a direction perpendicular to an axial direction of the sleeve portion;
   a connecting portion;
   a golf bag prop pad; thickness of an upper end of the golf bag prop pad being greater than that of a lower end of the golf bag prop pad; and
   a stopping element; the stopping element being secured on the corresponding tube part and held within the slot of the sleeve portion such that the propping member pivots about an axis of the tube part.

5. The propping structure of a golf trolley as claimed in claim 4, wherein each of stopping elements has a through hole, and screws are passed through the through holes of the stopping elements as well as nuts secured on the tube parts of the trolley frame to fix the stopping elements on the tube parts.

* * * * *